(12) United States Patent
Popp

(10) Patent No.: US 9,604,083 B2
(45) Date of Patent: *Mar. 28, 2017

(54) FIRE SUPPRESSANT DEVICE AND METHOD, INCLUDING EXPANSION AGENT

(71) Applicant: Federal Express Corporation, Memphis, TN (US)

(72) Inventor: James B. Popp, Olive Branch, MS (US)

(73) Assignee: FEDERAL EXPRESS CORPORATION, Memphis, TN (US)

(*) Notice: Subject to any disclaimer, the term of this patent is extended or adjusted under 35 U.S.C. 154(b) by 0 days.

This patent is subject to a terminal disclaimer.

(21) Appl. No.: 15/088,837

(22) Filed: Apr. 1, 2016

(65) Prior Publication Data
US 2016/0213964 A1    Jul. 28, 2016

Related U.S. Application Data

(63) Continuation of application No. 12/293,865, filed as application No. PCT/US2007/006981 on Mar. 21, 2007, now Pat. No. 9,308,404.
(Continued)

(51) Int. Cl.
*A62C 35/08* (2006.01)
*A62C 3/00* (2006.01)
(Continued)

(52) U.S. Cl.
CPC ............... *A62C 35/08* (2013.01); *A62C 3/00* (2013.01); *A62C 3/002* (2013.01); *A62C 3/07* (2013.01);
(Continued)

(58) Field of Classification Search
CPC .... A62C 3/00; A62C 3/08; A62C 5/00; A62C 5/006; A62C 31/00; A62C 31/02;
(Continued)

(56) References Cited

U.S. PATENT DOCUMENTS 3,713,491 A    1/1973   Grabowski et al.
3,799,271 A    3/1974   Mitchell et al.
(Continued)

FOREIGN PATENT DOCUMENTS

EP    0 951 923 A1    10/1999
GB    485161          5/1938
(Continued)

OTHER PUBLICATIONS

International Preliminary Report on Patentability issued Sep. 23, 2008, in PCT/US2007/006981, filed Mar. 21, 2007.
(Continued)

*Primary Examiner* — Christopher Kim
(74) *Attorney, Agent, or Firm* — Finnegan, Henderson, Farabow, Garrett & Dunner, LLP

(57) ABSTRACT

A device for suppressing and/or extinguishing a fire associated with a container may include a housing defining a hollow sleeve and a column configured to be received within the hollow sleeve. The column may define a first chamber, a second chamber, at least one aperture, and a piercing end configured to pierce a barrier. The first chamber may be configured to receive an expansion agent, and the second chamber may be configured to receive a fire extinguishing agent. The device may be configured such that upon activation of the expansion agent, the column extends from the housing so as to enable the piercing end to penetrate the container and to enable the fire extinguishing agent to be delivered into an interior of the container via the at least one aperture.

26 Claims, 5 Drawing Sheets

Related U.S. Application Data

(60) Provisional application No. 60/784,448, filed on Mar. 22, 2006.

(51) Int. Cl.
  *A62C 31/22* (2006.01)
  *B64D 25/00* (2006.01)
  *A62C 3/07* (2006.01)
  *A62C 5/00* (2006.01)

(52) U.S. Cl.
  CPC .............. *A62C 31/22* (2013.01); *B64D 25/00* (2013.01); *A62C 5/006* (2013.01)

(58) Field of Classification Search
  CPC ......... A62C 31/22; A62C 35/08; A62C 3/002; A62C 3/07; A62C 25/00; B64D 25/00
  USPC ... 169/43, 45–47, 53, 56–62, 26–29, 71, 72, 169/74, 77, 84, 85, 89; 239/271, 272, 276
  See application file for complete search history.

(56) References Cited

U.S. PATENT DOCUMENTS

| | | | |
|---|---|---|---|
| 3,833,064 A | 9/1974 | Ranney, Jr. | |
| 3,848,231 A | 11/1974 | Wootton | |
| 3,909,814 A | 9/1975 | Eguchi | |
| 4,011,911 A | 3/1977 | Gow | |
| 4,058,167 A | 11/1977 | Granek et al. | |
| 4,085,167 A | 4/1978 | Lewis et al. | |
| 4,101,872 A | 7/1978 | Pappas | |
| 4,124,077 A * | 11/1978 | Barge | A62C 37/10 169/37 |
| 4,466,489 A | 8/1984 | Lee | |
| 4,566,542 A | 1/1986 | Enk et al. | |
| 4,597,451 A | 7/1986 | Moore et al. | |
| 4,625,808 A | 12/1986 | Halfpenny | |
| 4,646,848 A | 3/1987 | Bruensicke | |
| 4,653,727 A | 3/1987 | Chang et al. | |
| 4,780,832 A | 10/1988 | Shah | |
| 4,875,526 A | 10/1989 | Latino et al. | |
| 4,981,178 A | 1/1991 | Bundy | |
| 4,987,958 A | 1/1991 | Fierbaugh | |
| 5,038,867 A | 8/1991 | Hindrichs et al. | |
| 5,059,953 A | 10/1991 | Parsons et al. | |
| 5,062,486 A | 11/1991 | McClenahan | |
| 5,113,945 A | 5/1992 | Cable | |
| 5,279,163 A | 1/1994 | D'Antonio et al. | |
| 5,301,756 A | 4/1994 | Relyea et al. | |
| 5,368,106 A | 11/1994 | Coughlin | |
| 5,511,535 A | 4/1996 | Landstrom et al. | |
| 5,540,402 A | 7/1996 | Carducci | |
| 5,551,780 A | 9/1996 | Wintrich et al. | |
| 5,746,396 A | 5/1998 | Thorton-Trump | |
| 5,880,867 A | 3/1999 | Ronald | |
| 5,881,819 A | 3/1999 | Walters et al. | |
| 5,899,414 A | 5/1999 | Duffoo | |
| 5,913,367 A | 6/1999 | Hampton | |
| 6,003,608 A | 12/1999 | Cunningham | |
| 6,032,745 A | 3/2000 | Sears | |
| 6,104,301 A | 8/2000 | Golden | |
| 6,491,254 B1 | 12/2002 | Walkinshaw et al. | |
| 6,543,547 B2 | 4/2003 | Neumeir et al. | |
| 6,561,281 B1 | 5/2003 | Arnold | |
| 6,588,512 B2 | 7/2003 | Sundholm | |
| 6,601,653 B2 | 8/2003 | Grabow et al. | |
| 6,676,081 B2 | 1/2004 | Grabow et al. | |
| 6,688,664 B2 | 2/2004 | Sioutis | |
| 6,709,154 B1 | 3/2004 | Janotte | |
| 6,719,214 B1 | 4/2004 | Shaffer | |
| 6,739,400 B2 | 5/2004 | Lessi et al. | |
| 6,995,966 B2 | 2/2006 | Zansky et al. | |
| 7,055,613 B1 | 6/2006 | Bissen et al. | |
| 7,121,353 B2 | 10/2006 | Setzer | |
| 7,137,456 B2 | 11/2006 | Moses | |
| 7,456,750 B2 | 11/2008 | Popp et al. | |
| 9,308,404 B2 * | 4/2016 | Popp | A62C 3/00 |
| 2001/0054964 A1 | 12/2001 | Popp et al. | |
| 2002/0037026 A1 | 3/2002 | Sato et al. | |
| 2002/0040789 A1 | 4/2002 | Neumeir et al. | |
| 2003/0230414 A1 | 12/2003 | Peltola et al. | |
| 2005/0140515 A1 | 6/2005 | Goodchild | |

FOREIGN PATENT DOCUMENTS

| | | |
|---|---|---|
| GB | 2 117 138 A | 10/1983 |
| GB | 2 327 606 A | 3/1999 |
| SU | 588 987 A1 | 1/1978 |
| SU | 1 811 872 C | 4/1993 |
| WO | WO 93/12839 A1 | 7/1993 |
| WO | WO 03/72200 A1 | 9/2003 |
| WO | WO 2007/027600 A1 | 3/2007 |

OTHER PUBLICATIONS

Notice of Panel Decision from Pre-Appeal Brief Review dated Sep. 1, 2006 in U.S. Appl. No. 09/837,228, filed Apr. 19, 2001.
Board of Patent Appeals and Interferences Decision on Appeal dated Apr. 29, 2008, in U.S. Appl. No. 09/837,228, filed Apr. 19, 2001.
Office Action dated Oct. 3, 2002, in U.S. Appl. No. 09/837,228, filed Apr. 19, 2001.
Office Action dated May 7, 2003, in U.S. Appl. No. 09/837,228, filed Apr. 19, 2001.
Office Action dated Jan. 30, 2004, in U.S. Appl. No. 09/837,228, filed Apr. 19, 2001.
Office Action dated Nov. 19, 2004, in U.S. Appl. No. 09/837,228, filed Apr. 19, 2001.
Office Action dated Jun. 28, 2005, in U.S. Appl. No. 09/837,228, filed Apr. 19, 2001.
Office Action dated Mar. 21, 2006, in U.S. Appl. No. 09/837,228, filed Apr. 19, 2001.
Examiner's Answer dated Nov. 15, 2006, in U.S. Appl. No. 09/837,228, filed Apr. 19, 2001.
International Search Report issued Feb. 1, 2007, in PCT/US2006/033518, filed Aug. 29, 2006.
Written Opinion issued Feb. 1, 2007, in PCT/US 2006/033518, filed Aug. 29, 2006.
International Search Report issued Aug. 24, 2007, in PCT/US2007/006981, filed Mar. 21, 2007.
Written Opinion issued Aug. 24, 2007, in PCT/US2007/006981, filed Mar. 21, 2007.
Notice of Allowance dated Jul. 23, 2008, in U.S. Appl. No. 09/837,228, filed Apr. 19, 2001.
Office Action dated Nov. 28, 2008, in U.S. Appl. No. 11/213,940, filed Aug. 30, 2005.
Communication of European Patent Office issued Jan. 13, 2009, in EP 07 753 593.8-1258, which corresspondes to PCT/US2007/006981, filed Mar. 21, 2007.
Office Action dated Jul. 7, 2009, in U.S. Appl. No. 11/213,940, filed Aug. 30, 2005.
Communication of European Patent Office issued Oct. 30, 2009, in EP 07 753 593.8-1258, which corresponds to PCT/US2007/006981, filed Mar. 21, 2007.
Office Action dated Dec. 9, 2009, in U.S. Appl. No. 12/267,033, filed Nov. 7, 2008.
Office Action dated Dec. 24, 2009, in U.S. Appl. No. 12/267,178, filed Nov. 7, 2008.
Notice of Allowance dated Feb. 17, 2010, in U.S. Appl. No. 11/213,940, filed Aug. 30, 2005.
Final Office Action dated Jun. 8, 2010, in U.S. Appl. No. 12/267,033, filed Nov. 7, 2008.
Office Action dated Jul. 22, 2010, in U.S. Appl. No. 12/548,489, filed Aug. 27, 2009.

* cited by examiner

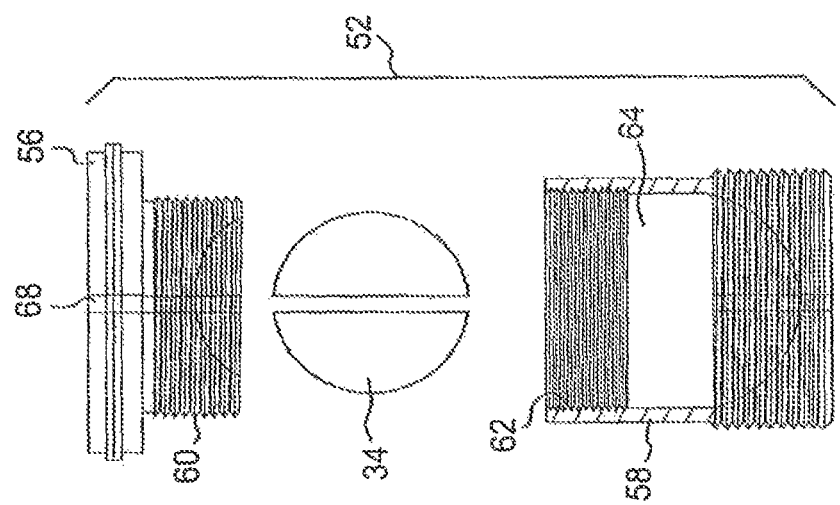
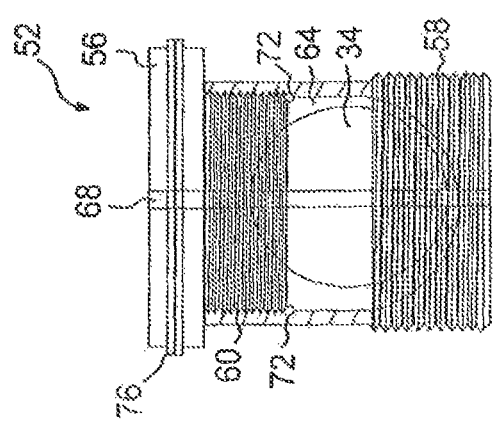
FIG. 3B
FIG. 3A

FIRE SUPPRESSANT DEVICE AND METHOD, INCLUDING EXPANSION AGENT

RELATED APPLICATIONS

This application is a continuation of U.S. application Ser. No. 12/293,865, filed Aug. 24, 2009, which is a U.S. national phase application filed under 35 U.S.C. 0371 based on PCT/US2007/006981, filed Mar. 21, 2007, which claims the benefit of priority of U.S. Provisional Application No. 60/784,448, filed Mar. 22, 2006, the disclosures of which are incorporated herein by reference.

FIELD OF THE INVENTION

The present disclosure relates to devices and methods for suppressing and/or extinguishing a fire. In particular, the present disclosure relates to devices and methods for suppressing and/or extinguishing a fire associated with a container.

Background

In some instances, it may be difficult to suppress and/or extinguish a fire due to the nature of the location of the fire. For example, a fire associated within an interior of a container may be difficult to suppress and/or extinguish because it may be difficult to deliver an effective extinguishing agent to the location of the container and/or it may be difficult to deliver an effective extinguishing agent to the interior of the container, so that the extinguishing agent may be applied to the fire.

An example of a fire that may be difficult to suppress and/or extinguish due to the nature of the location of a fire may include fires associated with cargo. For example, cargo fires on board freighter aircraft may be intrinsically dangerous and/or difficult to extinguish because, for example, access to the cargo area may be restricted or impractical once the cargo has been positioned within the freighter aircraft.

For example, the airfreight industry uses containers and pallets, which are sometimes generically referred to as "Unit Load Devices" or "ULDs," to consolidate and ship freight. Such containers, for example, may be constructed of various materials, such as aluminum, fiberglass, and/or other suitable materials. Such containers, when loaded into freighter aircraft, enclose and restrain the freight. Furthermore, such containers may include features configured to engage retractable locks located in, for example, an aircraft floor cargo handling system, which may provide desirable fore-aft, lateral, and/or vertical restraint during ground and flight operations.

Cargo containers may be typically loaded in "sticks" of two (i.e., two containers are placed across the width of the cargo area, such as a freighter aircraft fuselage). An example of a typical container widely used is designated "AMJ" under National Aerospace Standard 3610. An AMJ defines a roughly rectangular box having an upper edge on one side that may be chamfered or curved, for example, to follow the cross-sectional geometry of an aircraft fuselage. The AMJ has a base dimension of about 125 inches long by about 96 inches wide, and a height dimension of about 96 inches (i.e., on the non-chamfered/non-curved side). Other containers are known to those skilled in the art, and perhaps two-dozen containers of differing sizes are commonly used.

Once loaded into the cargo area of a freighter aircraft fuselage, only the most forward containers may be accessible to flight crews. Even the most forward containers, however, may permit only limited access thereto. If a fire were to occur in a container aft of the forward containers, there may be no practical way to manually deliver a fire-extinguishing agent to the fire.

One possible option would be to install a fixed, automatically-actuated, bottle-type fire suppressant device in each container. Due to high cost, high weight, and/or maintenance considerations, it may be impractical to install such devices in each container. In particular, an airfreight operator may have many thousands of containers in inventory at any one time. Furthermore, according to a common industry practice sometimes referred to as "interlining," airfreight operators temporarily share and/or exchange containers. Such a practice might lead to a lack of cargo protection, for example, for instances in which an airfreight operator borrows containers from another airfreight operator who does not install such devices.

Another possible option would be to install pyrotechnic gas generator devices or cartridges in each container. Pyrotechnic gas generator devices may provide a lightweight and efficient method of suppressing and/or extinguishing container fires. The installation of such devices in each container, however, may be undesirable for a number of reasons. For example, these devices may be prohibitively expensive in light of the large number of containers involved. Furthermore, cargo containers may often be exposed to shocks, vibrations, and/or temperature extremes for extended periods of time. Such exposure could result in damage to the devices, such as, for example, cracks in the propellant. Such damage might render such devices dangerous and/or ineffective.

For these and other reasons, there is a need for alternative approaches that may overcome one or more of the above-outlined drawbacks with the options described above.

One subject of the invention relates to suppressing and/or extinguishing a fire associated with a container located where manual application of a fire extinguishing agent may be impractical. A further subject of the invention relates to suppressing and/or extinguishing a fire associated with a container that does not require locating a fire extinguishing device within the container. Yet another subject of the invention relates to suppressing and/or extinguishing a fire associated with a container located in a cargo area. Still a further subject of the invention relates to suppressing and/or extinguishing a fire associated with a container by delivering a fire extinguishing agent to the interior of the container. A further subject of the invention relates to suppressing and/or extinguishing a fire associated with a container that does not unduly hinder processes associated with moving the container into a cargo area.

The invention may seek to satisfy one or more of the above-mentioned subjects. Although the present invention may obviate one or more of the above-mentioned desires, it should be understood that some aspects of the invention might not necessarily obviate them.

SUMMARY

In the following description, certain aspects and embodiments will become evident. It should be understood that the invention, in its broadest sense, could be practiced without having one or more features of these aspects and embodiments. It should be understood that these aspects and embodiments are merely exemplary.

In one aspect, as embodied and broadly described herein, the invention includes a device for suppressing and/or extinguishing a fire associated with a container. The device may include a housing defining a hollow sleeve and a column configured to be received within the hollow sleeve. The column may define a first chamber, a second chamber, at least one aperture, and a piercing end configured to pierce a barrier. The first chamber may be configured to receive an expansion agent and the second chamber may be configured to receive a fire extinguishing agent. The device may be configured such that upon activation of the expansion agent, the column extends from the housing so as to enable the piercing end to penetrate the container and to enable the fire extinguishing agent to be delivered into an interior of the container via the at least one aperture.

According to another aspect, a cargo vehicle may include a device configured to suppress and/or extinguish a fire associated with a cargo container associated with the cargo vehicle. The device may include a housing mounted in the cargo vehicle in the vicinity of a cargo container. The housing may define a hollow sleeve. The device may include a column received within the hollow sleeve. The column may define a first chamber, a second chamber, at least one aperture, and a piercing end configured to pierce a barrier. The first chamber may be configured to receive an expansion agent and the second chamber may be configured to receive a fire extinguishing agent. The device may be configured such that upon activation of the expansion agent, the column extends from the housing so as to enable the piercing end to penetrate the container and to enable the fire extinguishing agent to be delivered into an interior of the container via the at least one aperture.

According to yet another aspect, a method for suppressing and/or extinguishing a fire associated with a container may include providing a device including a housing, a column configured to extend from the housing, an expansion agent, and a fire extinguishing agent. The method may further include activating the expansion agent such that the column extends from the housing, and delivering the fire extinguishing agent to an interior of the container.

Aside from the structural and procedural arrangements set forth above, the invention could include a number of other arrangements such as those explained hereinafter. It is to be understood that both the foregoing description and the following description are exemplary only.

BRIEF DESCRIPTION OF THE DRAWINGS

The accompanying drawings are incorporated in and constitute a part of this specification. The drawings illustrate exemplary embodiments and, together with the description, serve to explain some principles of the invention. In the drawings.

FIG. 3A is a schematic, partial section view of portions of the exemplary embodiment depicted in FIG. 1;

FIG. 3B is a schematic, partial exploded view of the portions depicted in FIG. 3A;

DESCRIPTION OF EXEMPLARY EMBODIMENT

Figure 1:
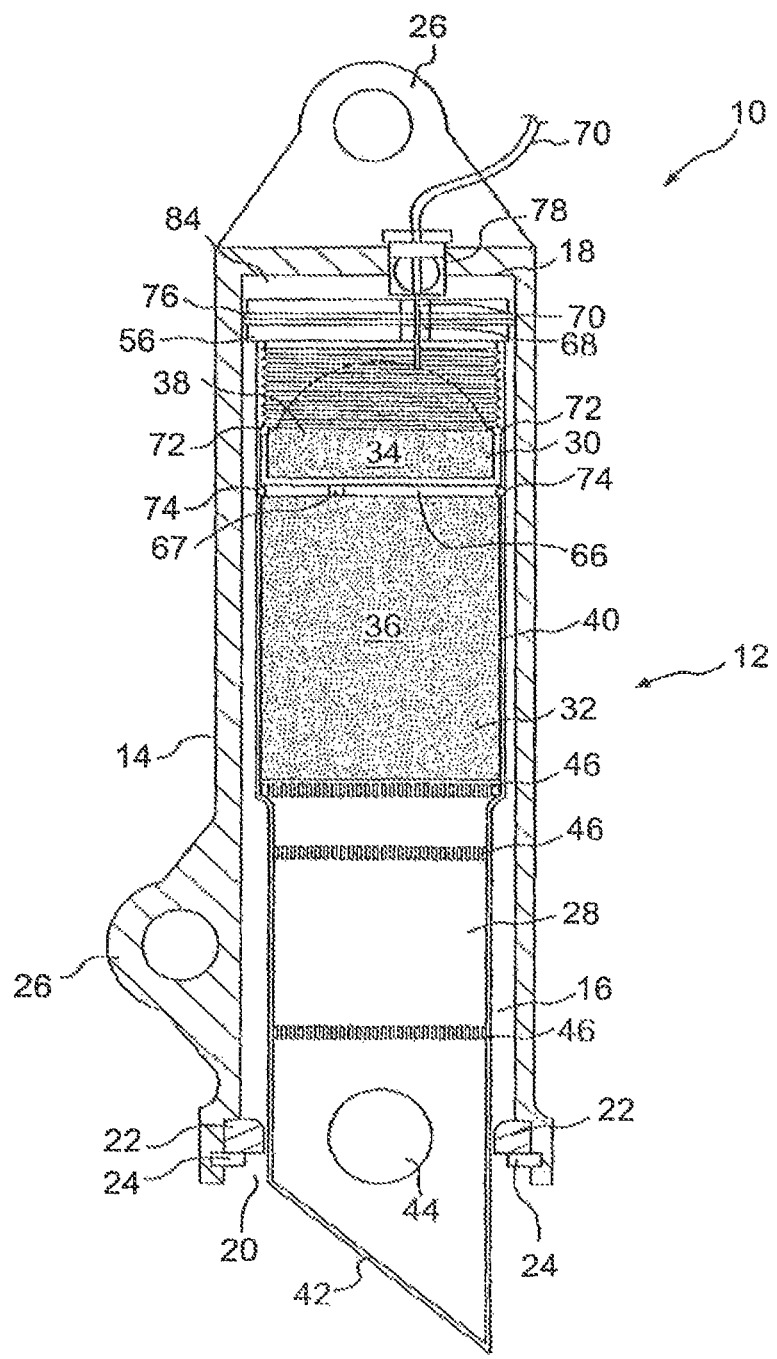
FIG. 1 is a schematic, partial section view of an exemplary embodiment of a device for suppressing and/or extinguishing a fire.
Figure 2:
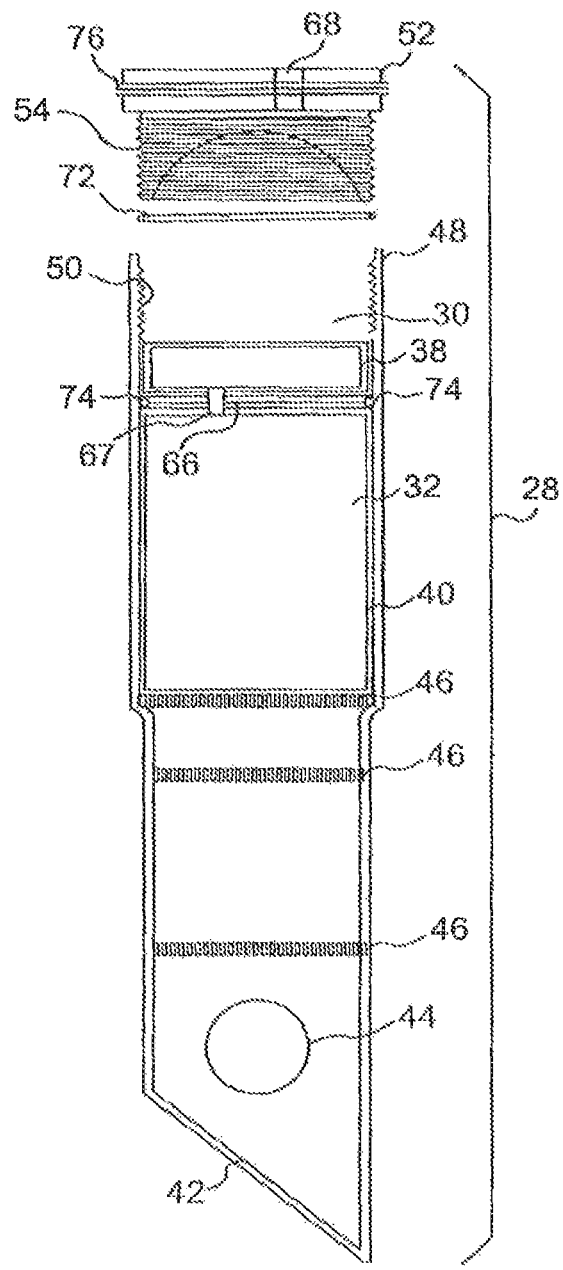
FIG. 2 is a schematic, partial exploded view of portions of the exemplary embodiment depicted in FIG. 1.

Reference will now be made in detail to an exemplary embodiment of the invention. Wherever possible, the same reference numbers are used in the drawings and the description to refer to the same or like parts.

According to the exemplary embodiment depicted in FIGS. 1-4, a device 10 for suppressing and/or extinguishing a fire includes an actuator 12. The device 10 may be provided in areas that may render it at least somewhat impractical to manually deliver a fire extinguishing agent. For example, such a device 10 may be positioned in the vicinity of a container, such that it may be activated and deliver fire extinguishing agent to the container (e.g., to the interior defined by the container). For example, one or more such devices 10 according to exemplary embodiments may be located in the vicinity of (e.g., mounted over) one or more cargo containers located in a cargo area of an aircraft. Such devices 10 may be located, for example, in the main deck and/or lower deck of an aircraft, although other locations and/or applications are contemplated, such as, for example, use in other cargo vehicles, such as trucks, trains, and ships.

As schematically-depicted in FIG. 1, the exemplary embodiment of the actuator 12 includes a main housing 14. The main housing 14 may define a hollow cylinder 16 having an end wall 18 at one end and an opening 20 at an opposing end. The hollow cylinder 16 may be provided with a guide/stop 22 located within the hollow cylinder 16 adjacent the opening 20. The guide/stop 22 may be retained in the hollow cylinder 16 with, for example, a retainer 24 (e.g., a snap ring). The main housing 14 may be provided with one or more mounting lugs 26 configured to permit the device 10 to be mounted in a desired location. Alternatively, or in addition, other structures may be provided to permit appropriate mounting of the device 10.

The hollow cylinder 16 of the main housing 14 may be configured to receive a column 28. As schematically-depicted in FIG. 2, the exemplary embodiment of the column 28 defines an expansion chamber 30 and an extinguishing agent chamber 32. The expansion chamber 30 is configured to receive, for example, an expansion agent 34 (e.g., a pyrotechnic charge), and the extinguishing agent chamber 32 is configured to receive a fire extinguishing agent 36 (e.g., a fire extinguishing pyrotechnic charge). The expansion agent 34 and/or the fire extinguishing agent 36 may be contained within an expansion agent cartridge 38 and a fire extinguishing agent cartridge 40, respectively. The fire extinguishing agent 36 may include a pyrotechnic charge configured to generate a fire suppressant when ignited.

The column 28 may define a piercing end 42 configured to pierce a barrier, for example, a wall of a container. The column 28 may also include one or more apertures 44 and/or baffles 46 configured to permit delivery a fire extinguishing agent therethrough. For example, column 28 may be provided with one or more rows of baffles 46, which extend at least partially (e.g., fully) around the column 28.

At an end 48 of the column 28 opposite the piercing end 42, the column 28 may define a threaded portion 50 on either the interior or exterior surface of the column 28. The end 48 may be configured to receive a piston end cap 52, which may be provided with a threaded portion 54 configured to engage the threaded portion 50 of the column 28. The piston end cap 52 is configured to close and seal the end 48 of column 28.

As schematically-depicted in FIGS. 3A and 3B, the exemplary embodiment of the piston end cap 52 includes a cap portion 56 and base portion 58. The cap portion 56 may include a threaded portion 60 configured to engage a threaded portion 62 of the base portion 58. The cap portion 56 may be mounted on the base portion 58, for example, via threaded portions 60 and 62, to form a housing 64 configured to receive an expansion agent 34, which may be on the form of, for example, a ball or lump of material (e.g., when the expansion agent is a moldable and/or clay-like material).

Access may be gained to the extinguishing agent chamber 32 of the column 28 by removing the end cap 52 from the end 48 of the column 28. The fire extinguishing agent 36, which may be in the form of a cartridge, may be loaded into the extinguishing agent chamber 32 of the column 28. According to some embodiments, the extinguishing agent chamber 32 and the expansion chamber 30 may be separated from one another by, for example, a separator 66. The separator 66 may include a timing fuse 67, and the separator 66 may be configured to delay ignition of the fire extinguishing agent 36 via ignition of the expansion agent 34 until such time as, for example, the timing fuse 67 burns through and ignites the extinguishing agent 36. The separator 66 may be placed above (e.g., on top of) the extinguishing agent 36. The expansion agent 34, which may be in the form of a cartridge, may be placed in the housing 64 of the piston end cap 52, which may be mounted on the end 48 of the column 28.

The cap portion 56 of the piston end cap 52 may define an aperture 68, and an igniter lead 70 (e.g., an electric igniter lead, such as, for example, an electric match or squib) may extend into the housing 64 of the piston end cap 52. The igniter lead 70 may contact (e.g., penetrate) the expansion agent 34. According to some embodiments, a sealing compound may be present around the igniter lead 70 at the aperture 68. For example, the sealing compound may fill a spherical area located around the igniter lead 70 at the aperture 68. The sealing compound may include one or more of ventex clay, polytetrafluoroethylene (PTFE), and/or high temperature silicone rubber (RTV). The sealing compound may serve to reduce or substantially prevent a loss of pressure after the igniter lead 70 has activated the expansion agent 34, such that the column 28 has sufficient force to pierce a barrier, for example, the wall of a container.

The piston end cap 52 may be provided with one or more seals 72, for example, "O" ring seal(s) (e.g., polymer "O" ring seal(s)) for providing a sealed relationship between the cap portion 56 and the base portion 58 of the piston end cap 52. According to some embodiments, one or more seals 74 (e.g., high temperature-resistant "O" ring seals) may be provided between the separator 66 and the interior wall of the column 28. Furthermore, a dynamic seal 76 may be provided between the main housing 14 and the column 28. For example, the dynamic seal 76 may be provided between the cap portion 56 of the piston end cap 52 and an interior surface of the main housing 14. The dynamic seal 76 may include one or more (e.g., two) offset-gap piston ring(s) received by groove(s) in the circumference of the cap portion 56.

According to the exemplary embodiment schematically-depicted, the device 10 may be prepared for operation by removing the column 28 from the main housing 14. The piston end cap 52 may be removed from the column 28, and fire extinguishing agent 36 may be loaded into the extinguishing agent chamber 32. The cap portion 56 of the piston end cap 52 may be removed and expansion agent 34 may be loaded into the housing 64 partially formed by the base portion 58. The igniter lead 70 may be fed through an opening 78 defined, for example, in the end wall 18 of the main housing 14 and into the aperture 68 in the cap portion 56 of the piston end cap 52. The igniter lead 70 may be embedded in the expansion agent 34, for example, by molding the expansion agent 34 around a free end of the igniter lead 70, which extends through the aperture 68 of the cap portion 56. The cap portion 56 may then be mounted on the base portion 58, enclosing the expansion agent 34 in the housing 64 of the piston end cap 52. The one or more seals 72 may provide a substantially airtight seal between the cap portion 56 and the base portion 58. According to some embodiments, the seal(s) 72 may be allowed to cure prior to use of the device 10.

The piston end cap 52 may be mounted on the column 28 via respective threaded portions 54 and 50. The end 48 of the column 28 having the piston end cap 52 mounted thereon may be inserted into the main housing 14. As the column 28 is inserted into the main housing 14, the igniter lead 70 may be pulled from the opening 78 in the main housing 14 to prevent excess length of the igniter lead 70 from accumulating between the piston end cap 52 and the end wall 18 of the main housing 14. Once the column 28 has been fully inserted into the main housing, the guide/stop 22 may be assembled to the main housing 14 and secured in place with the retainer 24.

Figure 4:
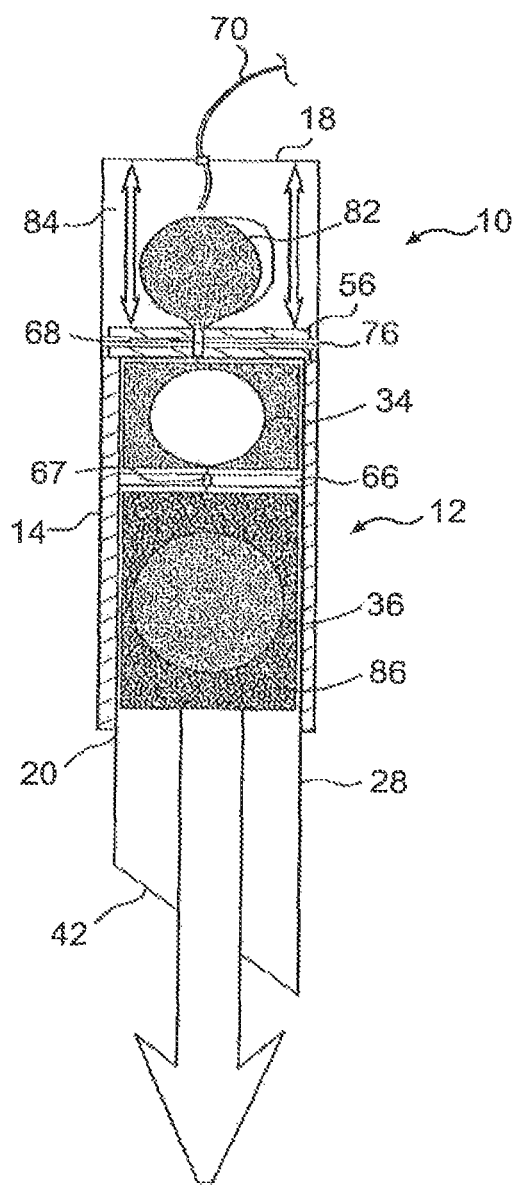
FIG. 4 is a partial, schematic section view of the exemplary embodiment of FIG. 1 depicted during operation.

The device 10 may be activated by providing an electric current to the igniter lead 70, thereby igniting the expansion agent 34, as schematically-depicted in FIG. 4. Once the expansion agent 34 has been ignited, the expansion agent 34 generates a pressurized gas 82 that is in flow communication with an upper portion 84 of the hollow cylinder 16 of the main housing 14 via the aperture 68 in the cap portion 56. As the pressurized gas increases the pressure between the cap portion 56 and the end wall 18 of the main housing 14, the column 28 is pushed toward the opening 20 of the hollow cylinder 16 of the main housing 14, which, in turn, pushes the piercing end 42 of the column 28 with sufficient force to pierce, for example, a wall of a container (e.g., a top of a cargo container, for example, when the device 10 is mounted above a container in a cargo area). The guide/stop 22 and the cap portion 56 of the piston end cap 52 are configured such that the movement of the column 28 is stopped when the cap portion 56 abuts the guide/stop 22 and prevents the column 28 from separating from the main housing 14. The expansion agent 34 may be selected and/or configured, for example, so that the pressure generated by ignition of the expansion agent 34 does not exceed a burst pressure of the device 10.

Ignition of the expansion agent 34 may also result in activation of the timing fuse 67 at the separator 66. Once the timing fuse 67 burns through to the extinguishing agent chamber 32, the fire extinguishing agent 36 is ignited, which generates a gas that exits the extinguishing chamber 32 of the column 28 via, for example, apertures 44 and/or baffles 46 (which may serve to cool the fire extinguishing agent 36) into interior of the container that has already been pierced by the piercing end 42 of the column 28. The gas released into the interior of the container may serve to form a gas cloud that may suppress and/or extinguish a fire in the interior of the container by, for example, smothering and/or interfering with the combustion process of the fire in the container.

According to some embodiments, the device 10 may be configured to release fire extinguishing agent 36 more than once. For example, the device 10 may be configured to release fire extinguishing agent 36 a plurality of times, for example, four to six times. In particular, the device 10 may be configured to release fire extinguishing agent 36 on a first occasion, such that, for example, a fire within a container is suppressed for a period of time ranging from, for example, about 30 minutes to about 45 minutes. Thereafter, the device 10 according to some embodiments may be configured to release fire extinguishing agent 36 a second time, for example, to suppress any fire in the container that has reignited or flared up as a result of diminishing effects of the fire extinguishing agent 36 released on the first occasion. The device 10 may be configured to repeat the release of fire extinguishing agent 36 a number of times at intervals that are either relatively constant or that vary. For example, the device 10 may include a plurality of supplies (e.g., pellets) of fire extinguishing agent 36 contained within the extinguishing agent chamber 32. Each of the supplies of fire extinguishing agent 36 may be ignited independently of one another at different times via, for example, electronic fuses and/or chemical fuses that are configured to sequentially ignite the supplies of fire extinguishing agent 36. In this fashion, some embodiments of the device 10 may be configured to suppress a fire in a container for an extended duration of time, for example, up to about 4 hours.

Figure 5:
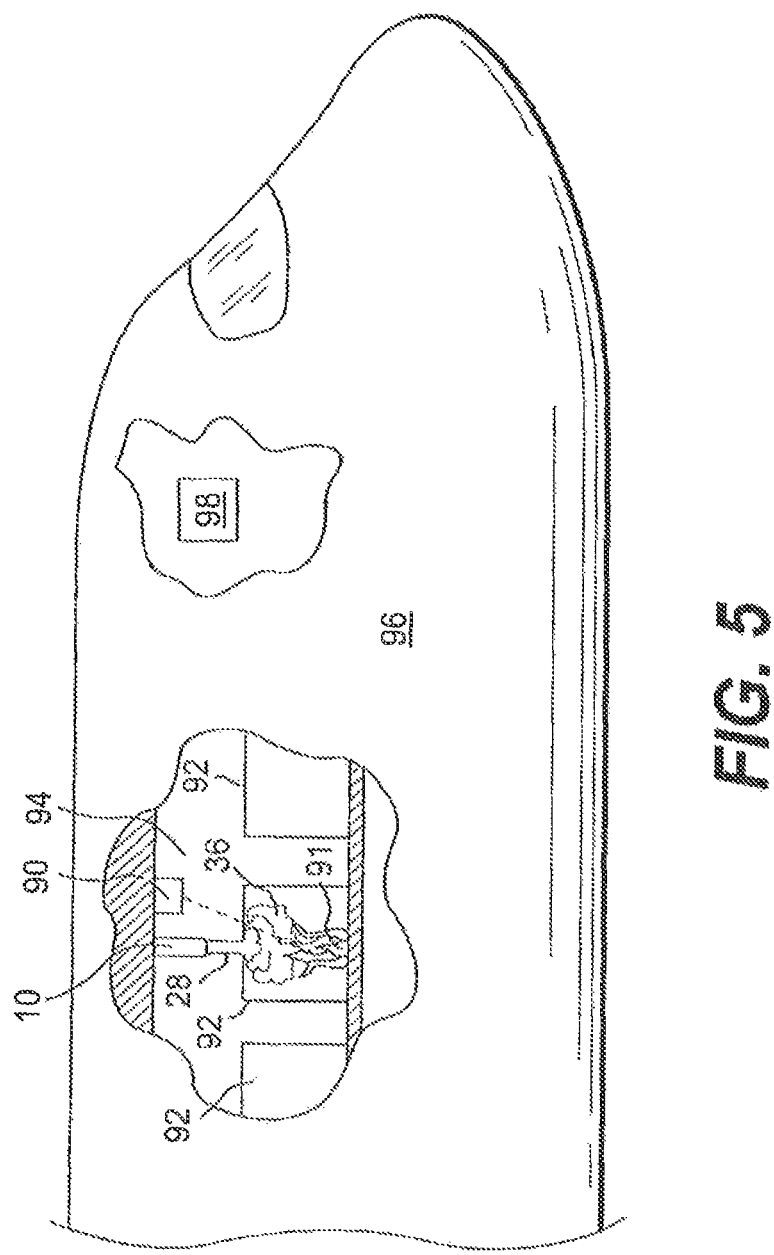
FIG. 5 is a schematic, partial cutaway view of the exemplary embodiment depicted in FIG. 1 located in an exemplary vehicle.

According to some embodiments, the device 10 may be activated remotely and/or automatically. For example, as schematically-depicted in FIG. 5, one or more detection devices 90 may be used to detect smoke, heat, and/or fire 91 associated with a cargo container 92 in a cargo area 94 of an aircraft 96. Such detection device(s) 90 may be configured to send a signal indicative of the detected smoke, heat, and/or fire 91 to a controller 98 that sends a signal to the device 10 (e.g., to the igniter lead 70, which, in turn, activates the column 28 of the device 10 to pierce a wall of the container 92 and deliver the fire extinguishing agent 36 to the interior of the container 92). Alternatively, or in addition, the signal from the detection device(s) 90 may result in an indication to a flight crew of the detected smoke, heat, and/or fire 91, and the flight crew may manually activate a system that sends a signal to the device 10, which activates the device 10.

Although the exemplary embodiment of the device 10 has been described in relation to an aircraft, use of the device 10 is not limited to an aircraft. For example, it is contemplated that the device 10 could be used in other environments that might experience a fire in a location that might render it impractical for manual application of a fire extinguishing agent and/or on an opposite side of a barrier.

This application also includes an attached document, which discusses some exemplary aspects and examples of optional features.

It will be apparent to those skilled in the art that various modifications and variations can be made to the structure and methodology described herein. Thus, it should be understood that the invention is not limited to the subject matter discussed in the specification. Rather, the present invention is intended to cover modifications and variations.

What is claimed is:

1. A device for suppressing and/or extinguishing a fire associated with a container, the device comprising:
   a housing defining a hollow sleeve; and
   a column configured to be received at least in part within the hollow sleeve, the column defining a chamber, at least one aperture, and a piercing end,
   wherein the chamber is configured to receive an expansion agent and the column is configured to receive a fire extinguishing agent,
   wherein the device is configured such that upon activation of the expansion agent, the column extends from the housing so as to enable the piercing end to penetrate the container and to enable the fire extinguishing agent to be delivered into an interior of the container via the at least one aperture, and
   wherein the device further comprises an igniter lead configured to activate the expansion agent.

2. The device of claim 1, further comprising the expansion agent received in the chamber.

3. The device of claim 2, wherein the expansion agent comprises a pyrotechnic charge.

4. The device of claim 1, further comprising the fire extinguishing agent received in the column.

5. The device of claim 4, wherein the fire extinguishing agent comprises a fire extinguishing pyrotechnic charge.

6. The device of claim 1, wherein the chamber comprises a first chamber configured to receive the expansion agent and the column further comprises a second chamber configured to receive the fire extinguishing agent.

7. The device of claim 1, further comprising a timing fuse configured to activate the fire extinguishing agent after activation of the expansion agent.

8. The device of claim 1, wherein the housing comprises a stop member configured to prevent the column from separating from the housing when the column extends from the housing.

9. A device for suppressing and/or extinguishing a fire associated with a container, the device comprising:
   a housing defining a hollow sleeve; and
   a column configured to be received at least in part within the hollow sleeve, the column defining a chamber, at least one aperture, and a piercing end,
   wherein the chamber is configured to receive a fire extinguishing agent and the column is configured to receive an expansion agent,
   wherein the device is configured such that upon activation of the expansion agent, the column extends from the housing so as to enable the piercing end to penetrate the container and to enable the fire extinguishing agent to be delivered into an interior of the container via the at least one aperture, and
   wherein the device further comprises the fire extinguishing agent received in the chamber, and the fire extinguishing agent comprises a fire extinguishing pyrotechnic charge.

10. The device of claim 9, further comprising the expansion agent received in the column.

11. The device of claim 10, wherein the expansion agent comprises a pyrotechnic charge.

12. The device of claim 9, wherein the chamber comprises a first chamber configured to receive the fire extinguishing agent and the column further comprises a second chamber configured to receive the expansion agent.

13. The device of claim 9, further comprising a timing fuse configured to activate the fire extinguishing agent after activation of the expansion agent.

14. The device of claim 9, further comprising an igniter lead configured to activate the expansion agent.

15. The device of claim 9, wherein the housing comprises a stop member configured to prevent the column from separating from the housing when the column extends from the housing.

16. A method for suppressing and/or extinguishing a fire associated with a container, the method comprising:
   providing a device comprising
      a housing defining a hollow sleeve,
      a column configured to be received at least in part within the hollow sleeve defined by the housing in an initial position and configured to extend at least in part from the hollow sleeve in an activated position,
an expansion agent, and
a fire extinguishing agent;
igniting the expansion agent such that the column extends from the hollow sleeve defined by the housing to the activated position but is prevented from separating from the housing; and
delivering the fire extinguishing agent to an interior of the container, when the column is in the activated position.

17. The method of claim 16, wherein delivering the fire extinguishing agent to the interior of the container comprises piercing the container via the column.

18. The method of claim 17,
wherein the device includes a plurality of separate supplies of fire extinguishing agent, and
wherein delivering the fire extinguishing agent to the interior of the container comprises independently delivering the separate supplies of fire extinguishing agent at separate times over a duration of time.

19. The method of claim 18, wherein the separate supplies of fire extinguishing agent comprise separate fire extinguishing pyrotechnic charges that are ignited independently of one another.

20. The method of claim 19, wherein the separate fire extinguishing pyrotechnic charges are ignited by fuses configured to sequentially ignite.

21. The method of claim 19,
wherein the plurality of separate supplies of fire extinguishing agent are contained within the column, the expansion agent comprises a pyrotechnic charge that when ignited results in the column piercing the container, and the separate supplies of fire extinguishing agent are delivered to the container through at least one aperture in a portion of the column piercing the container.

22. The method of claim 18, wherein the separate supplies of fire extinguishing agent are delivered to the interior of the container through at least one aperture in the column.

23. The method of claim 16, wherein delivering the fire extinguishing agent to the interior of the container is repeated a plurality of times.

24. The method of claim 16, wherein the expansion agent comprises a pyrotechnic charge, and igniting the expansion agent comprises igniting the pyrotechnic charge.

25. The method of claim 16, wherein igniting the expansion agent results in the column piercing the container.

26. The method of claim 25, wherein the fire extinguishing agent is delivered to the interior of the container through at least one aperture in the column.

* * * * *